US011956876B2

(12) United States Patent
De Jager et al.

(10) Patent No.: US 11,956,876 B2
(45) Date of Patent: Apr. 9, 2024

(54) LIGHT EMITTED DIODE, LED, BASED LIGHTING DEVICE AS WELL AS A CORRESPONDING LED BOARD AND A DRIVER BOARD

(71) Applicant: SIGNIFY HOLDING B.V., Eindhoven (NL)

(72) Inventors: Remco Rudolf Wilhelmus De Jager, Sittard (NL); Johannes Adrianus Cornelis Misdom, Weert (NL); Jaco Van Der Merwe, Kelpen-Oler (NL); Johannes Petrus Wernars, Megen (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 228 days.

(21) Appl. No.: 17/624,649

(22) PCT Filed: Jul. 2, 2020

(86) PCT No.: PCT/EP2020/068591
§ 371 (c)(1),
(2) Date: Jan. 4, 2022

(87) PCT Pub. No.: WO2021/001459
PCT Pub. Date: Jan. 7, 2021

(65) Prior Publication Data
US 2022/0264730 A1 Aug. 18, 2022

(30) Foreign Application Priority Data
Jul. 4, 2019 (EP) .................................... 19184325

(51) Int. Cl.
*H05B 45/30* (2020.01)
*H05B 45/50* (2022.01)
*H05B 47/19* (2020.01)

(52) U.S. Cl.
CPC ............. *H05B 47/19* (2020.01); *H05B 45/30* (2020.01); *H05B 45/50* (2020.01)

(58) Field of Classification Search
CPC ......... H05B 45/30; H05B 45/50; H05B 47/19
(Continued)

(56) References Cited

U.S. PATENT DOCUMENTS 10,743,395 B2 * 8/2020 Cartrette .............. H05B 47/185
2009/0237011 A1 * 9/2009 Shah ....................... F21S 8/035 313/1

(Continued)

FOREIGN PATENT DOCUMENTS

CN 108551703 A 9/2018
EP 2412209 A1 2/2012
WO 2018206343 A1 11/2018

*Primary Examiner* — William Hernandez

(57) ABSTRACT

An LED based lighting device capable of Radio Frequency communication, said LED based lighting device comprising a driver board comprising a mains input connector, an LED output connector and an LED driver, wherein said LED driver is arranged for receiving a mains power supply, via said mains input connector, and for providing an LED current to an at least one LED, via said LED output connector, an LED board comprising an LED input connector, an antenna and said at least one LED, an interconnect cable connecting said driver board to said LED board via said LED output connector and said LED input connector, wherein said driver board further comprises an RF module arranged for generating an RF signal and for superimposing said generated RF signal on said LED current such that said RF signal is conveyed over said interconnect cable to said antenna.

12 Claims, 2 Drawing Sheets

(58) Field of Classification Search
USPC ........................................................ 315/34, 85
See application file for complete search history.

(56) References Cited

U.S. PATENT DOCUMENTS

| | | | | |
|---|---|---|---|---|
| 2012/0139426 | A1* | 6/2012 | Ilyes | H05B 47/11 362/458 |
| 2013/0241406 | A1* | 9/2013 | Houri | H05B 45/24 315/34 |
| 2015/0189726 | A1* | 7/2015 | Spira | H05B 45/10 315/302 |
| 2018/0295689 | A1 | 10/2018 | Bandel | |
| 2020/0263837 | A1* | 8/2020 | Cao | F21V 23/006 |
| 2023/0189421 | A1* | 6/2023 | Wendt | H05B 47/175 315/121 |
| 2023/0217577 | A1* | 7/2023 | Saes | H05B 47/19 315/291 |

* cited by examiner

LIGHT EMITTED DIODE, LED, BASED LIGHTING DEVICE AS WELL AS A CORRESPONDING LED BOARD AND A DRIVER BOARD

CROSS-REFERENCE TO PRIOR APPLICATIONS

This application is the U.S. National Phase application under 35 U.S.C. § 371 of International Application No. PCT/EP2020/068591, filed on Jul. 2, 2020, which claims the benefit of European Patent Application No. 19184325.9, filed on Jul. 4, 2019. These applications are hereby incorporated by reference herein.

FIELD OF THE INVENTION

The present disclosure relates to a Light Emitting Diode, LED, based lighting device capable of Radio Frequency, RF, communication and, more specifically, to a LED based lighting device having a physically separated LED board with a driver board.

BACKGROUND OF THE INVENTION

Nowadays, more and more Light Emitting Diode, LED, based lighting devices are used. Such LED based lighting devices may be recognized in a plurality of applications, like at home, at the office, or even outdoors. The present application is especially directed to LED based lighting devices that are suitable to be used outdoors.

Such LED based lighting devices consist of a rectifier for converting a received Alternating Current, AC, supply voltage to a DC supply voltage, and an at least one LED for emitting light. The at least one LED are provided with the DC supply voltage, or a DC supply current.

It is often not sufficient for an LED based lighting device to merely provide lighting. Other functionality may also be incorporated. One of the functionalities that is often present in an LED based lighting device is wireless communication. The LED based lighting device may be equipped with a Radio Frequency, RF, module for communicating to the outside word.

Such communication may be used for controlling the LED based lighting devices. For example, the LED based lighting device may be turned on, turned off, controlled in intensity, controlled in color, or anything a like. This allows a user to remotely control the LED based lighting device, for example using a separate remote controller, an app on a smart phone or anything alike.

The LED based lighting device may also comprise sensors or actuators. The control of these sensors and/or actuators may then also be accomplished using wireless communication.

Most luminaires, especially luminaires that are used outdoors, have a metal casing in which the RF driver is embedded. To guarantee a good RF-signal quality, special cavities are provided in the metal casing to define a clear RF signal passage to the outside world. Also, the position and the size of these cavities are of importance which makes it even more difficult to guarantee a proper RF signal passage.

SUMMARY OF THE INVENTION

It would be advantageous if a LED based lighting device is provided which is more suitable to be used outdoors.

In a first aspect of the present disclosure, there is provided a Light Emitting Diode, LED, based lighting device capable of Radio Frequency, RF, communication. The LED based lighting device comprising:

a driver board comprising a mains input connector, an LED output connector and an LED driver, wherein said LED driver is arranged for receiving a mains power supply, via said mains input connector, and for providing an LED current to an at least one LED, via said LED output connector;

an LED board comprising an LED input connector, an antenna and said at least one LED;

an interconnect cable connecting said driver board to said LED board via said LED output connector and said LED input connector, for conveying said LED current from said driver board to said LED board;

wherein said driver board further comprises:

an RF module arranged for generating an RF signal and for superimposing said generated RF signal on said LED current such that said RF signal is conveyed over said interconnect cable to said antenna.

It was the insight of the inventors that it may be beneficial to implement the LED based lighting device using at least two boards: a driver board and an LED board. The LED board should then comprise the antenna, as the antenna may use the same cavity, or transparent window, or EM translucent materials, or anything alike, as is used by the array of LED present on the LED board. This is explained in more detail here below.

In accordance with the present disclosure, the driver board is arranged for receiving an AC mains supply voltage, and for converting said AC mains supply voltage to a DC component. Such a conversion may be performed using a rectifier. The driver board is arranged to provide an LED current.

The LED board is arranged to receive the LED current for powering the at least one LED present on the LED board. An interconnection, for example a cable, is present between the LED board and the driver board. This allows for a flexible solution. That is, the LED board does not need to be physically close to the driver board. The interconnection may have a length of approximately 1 meter, 10 meters or even longer. The interconnect cable may be shielded for ensuring a proper transfer of the RF signals between the driver board and the LED board.

The LED board and the driver board may be embodied in a single casing, or embodied in two separate casings. In any case, the LED board should have properties that allow the array of LED to emit light. For example, the LED board may not have a completely closed metal casing as in such a case light would not be able to escape.

The inventors have found that the above described properties of the LED board may also be used for communication purposes. As such, the antenna may be provided on the LED board. Communication control may, however, be present on the driver board. That is, the RF module is present on the driver board, while the antenna is present on the LED board.

The inventors have found a solution to efficiently convey the RF signal, generated by the RF module, to the LED board. The solution found is suitable as there is no need for additional cabling between the LED board and the driver board. The RF module is arranged to superimpose the RF signal on the LED current that is conveyed between the LED board and the driver board anyhow. The above may be accomplished as the RF signal has much higher frequency characteristics compared to the LED current.

It is noted that the present disclosure is especially described in a manner in which the RF module is arranged to transmit an RF signal to the outside world. The same is also valid in reception modus, in which the received RF signal is superimposed on the LED current and conveyed, from the LED board, to the driver board.

An interconnect between the antenna and the RF module may thus beneficially be realized by the LED based lighting device according to the present disclosure by superimposing said generated RF signal on said LED current such that said RF signal is conveyed over said interconnect cable to said antenna. This is beneficial for avoiding the need for an additional interconnect cable such as a coaxial cable. An LED based lighting device without an additional interconnect cable is advantageous to realize a relative cost effective and robust lighting device. The present disclosure relies at least partly on the insight that an interconnect cable such as a coaxial cable may be rather expensive and cumbersome since such a cable may prove to be rather fragile. By using the interconnect cable for providing both said LED current and said RF signal a relative low cost RF-signal interconnect may be realized.

In an example, the interconnect cable comprises two conductors, a first of said two conductors is arranged for conveying said LED current from said driver board to said LED board, and a second of said two conductors is arranged for providing a return path for said LED from said LED board to said driver board, thereby providing differential LED wires, wherein said RF module is further arranged for superimposing said generated RF signal on said differential LED wires thereby providing a balanced RF signal.

Following the above, the RF signal is thus conveyed, in a differential manner, over the LED wires. One of the advantages hereof is that Electromagnetic Interference is reduced.

In a further example, the driver board further comprises:

an Electromagnetic Interference, EMI, filter, for reducing EMI, wherein said EMI filter is connected to said LED output connector, and wherein said RF module is arranged for superimposing said generated RF signal on said LED current in between said EMI filter and said LED output connector.

The advantage of the above is that the risk is reduced that the RF signal would affect other electrical circuits present on the driver board, as the EMI filter will block the RF signal running into the driver itself.

In another example, the LED board comprises:

an RF extraction module arranged for extracting said superimposed RF signal from said LED current and for providing said extracted RF signal to said antenna.

The RF extraction module may be implemented as one or more capacitors, wherein the relatively high frequency characteristic of the RF signal allow that signal to pass the one or more capacitors while the relatively low frequency characteristic of the LED current does not allow that signal to pass the one or more capacitors. This prevents the high frequency RF signal to pass the LED's, thereby ensuring that the life span of these LED's is not reduced.

In a further example, the LED board is formed by a Printed Circuit Board, PCB, and comprises:

LED supply traces, on said PCB, for connecting said LED input connector to said at least one LED, wherein said antenna is formed in any of said LED supply traces.

An LED board may be constructed of a single metal layer substrate, composite epoxy material, COM. In this single metal layer substrate, a λ/4 antenna may be easily integrated having a good antenna performance and a clear path to the outside world. The idea of this example is to use the existing LED traces on the LED board, to implement such an antenna.

That is, the actual LED traces that carry the LED current from the connector to the at least one LED may also be used for the antenna.

The antenna may formed by including at least one inductor in said LED supply traces. The inductor "blocks" the relatively high frequency RF signal while it allows the LED current to pass. Such an inductor may thus form an end point for an antenna, while it does not influence the LED current flowing to the at least one LED.

The antenna may thus be formed, at one end, by said at least one inductor in said LED supply traces and, at another end, by a predefined characteristic impedance.

The characteristic impedance may, subsequently, be formed by a co-planar waveguide structure.

In accordance with the present disclosure, there may be provided a Light Emitting Diode, LED, board for operation in a LED based lighting device in wherein said LED board comprises an LED input connector, an antenna and said at least one LED, and wherein said LED board comprises a power supply line for supplying, via said LED input connector, said LED current to said at least one LED, and wherein said LED board further comprises an RF module for generating an RF signal and for superimposing said RF signal on said LED current, wherein said power supply line forms said antenna for said RF signal.

In a further example, the driver board comprises a insulation barrier for electrically isolating a first part, which is connected to said mains power supply with a second part, which is connected to said LED output connector, wherein said RF module is situated at said second part.

It was found that it may be beneficial to place the RF module as closely as possible to the LED output connector. This ensures that the quality of the RF signal is not affected. As such, the RF module is placed at the second part as disclosed above.

The above is actually counter intuitive as, in order to power the RF module, it may be beneficial to place the RF module at the first part as disclosed above. The inventors have, however, a preference for placing the RF module at the second part as they have found a beneficial way of powering the RF module as will be explained here below.

It is further noted that an insulation barrier may be required if the LED based lighting device is to be used outdoors. However, for, for example, indoor purposes, there might not be a need to have an insulation barrier present. In such a case, it would still be desirable to place the RF module as close as possible to the LED output connected for reducing the risk of malformations of the RF signal.

In an example, the driver board further comprises:

a Digital Addressable Lighting Interface, DALI, module which is situated at said second part, a voltage converter, situated at said first part, for converting said mains power supply to a DALI Direct Current, DC, voltage, wherein said voltage converter comprises a transformer placed over said insulation barrier, wherein an output of said transformer is connected to said DALI module, an RF module voltage converter, situated at said second part, for converting said DALI DC voltage to an RF supply voltage for powering said RF module.

Often, an LED based lighting device may be equipped with a DALI module for providing DALI functionality. The DALI module may require a 24Vdc supply voltage. Such a voltage is obtained by converting the incoming AC mains supply voltage to the 24Vdc. The voltage converter needs to bridge the insulation barrier. In order to do so, a transformer may be present in the voltage converter, wherein the transformer is placed over the insulation barrier. The creep and clearance distances of the transformer may be chosen such that it fulfils different safety requirements.

Finally, an RF module voltage converter may be utilized for converting the 24Vdc to a lower voltage component, for example 3.3Vdc. Such an RF module voltage converter does not need to be placed over the insulation barrier, as it uses the 24Vdc which is present on the second part for the DALI module. As such, there is no need for additional, comprehensive, power supplies at the first part of the driver board.

In an example, the RF module is further arranged for power metering said output of said LED driver.

The inventors have found that it may be beneficial if the RF module would perform other options as well. The RF module may be implemented in an Integrated Circuit, IC, a microcontroller, an Field Programmable Gate Array, or anything alike. General purpose Input/output pins of the RF module may be used for the power metering aspects. This reduces costs significantly.

In a further example, the driver board further comprises an optocoupler connected to said RF module for coupling said measured power over said insulation barrier.

In an example, said driver board is provided in a metal casing.

It is beneficial if said LED based lighting device comprises a control unit communicatively coupled to said LED driver and arranged for controlling said LED current, wherein said RF module comprises and Analog to Digital Converter, ADC, wherein an operating power of said at least one LED is monitor, by said control unit, via said ADC. This is beneficial for realizing a relative cost effective LED based lighting device.

In a second aspect of the present disclosure, there is provided a driver board for operation in a Light Emitting Diode, LED, based lighting device in accordance with any of the examples as provided above, wherein said driver board comprises a mains input connector, an LED output connector and an LED driver, wherein said LED driver is arranged for receiving a mains power supply, via said mains input connector, and for providing an LED current to an at least one LED, via said LED output connector, and wherein said driver board further comprises:

an RF module arranged for generating an RF signal and for superimposing said generated RF signal on said LED current such that said RF signal is conveyed over said interconnect cable to said antenna.

It is noted that the advantages and definitions as disclosed with respect to the embodiments of the first aspect of the invention also correspond to the embodiments of the second aspect of the invention, being the driver board.

In an example, the driver board comprises a insulation barrier for electrically isolating a first part, which is connected to said mains power supply with a second part, which is connected to said LED output connector, wherein said RF module is situated at said second part.

In a further example, the driver board further comprises:

a Digital Addressable Lighting Interface, DALI, module which is situated at said second part, a voltage converter, situated at said first part, for converting said mains power supply to a DALI Direct Current, DC, voltage, wherein said voltage converter comprises a transformer placed over said insulation barrier, wherein an output of said transformer is connected to said DALI module, an RF module voltage converter, situated at said second part, for converting said DALI DC voltage to an RF supply voltage for powering said RF module.

In a third aspect of the present disclosure, there is provided a Light Emitting Diode, LED, board for operation in a LED based lighting device in accordance with any of the examples as provided above, wherein said LED board comprises an LED input connector, an antenna and said at least one LED, and wherein said LED board comprises a power supply line for supplying, via said LED input connector, said LED current to said at least one LED, and wherein said power supply line forms said antenna.

It is noted that the advantages and definitions as disclosed with respect to the embodiments of the first aspect of the invention also correspond to the embodiments of the third aspect of the invention, being the LED board.

The and other aspects of the invention will be apparent from and elucidated with reference to the embodiment(s) described hereinafter.

DETAILED DESCRIPTION

Figure 1:
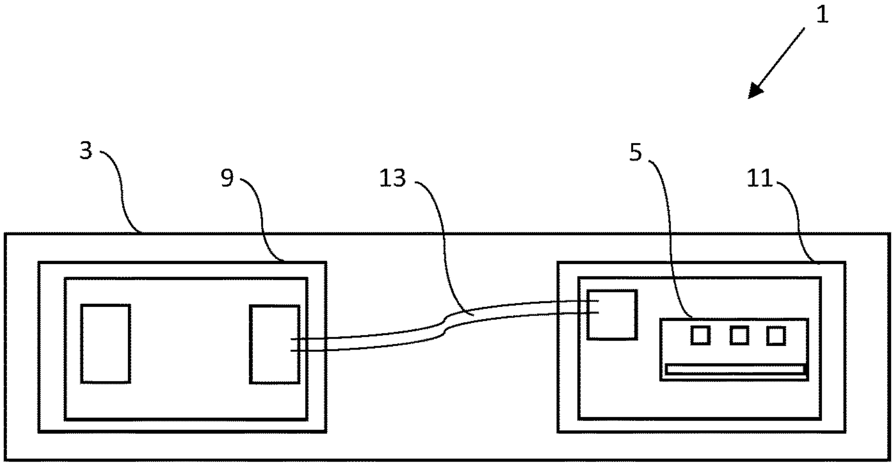
FIG. 1 shows a LED based lighting device according to the present disclosure.
Figure 2:
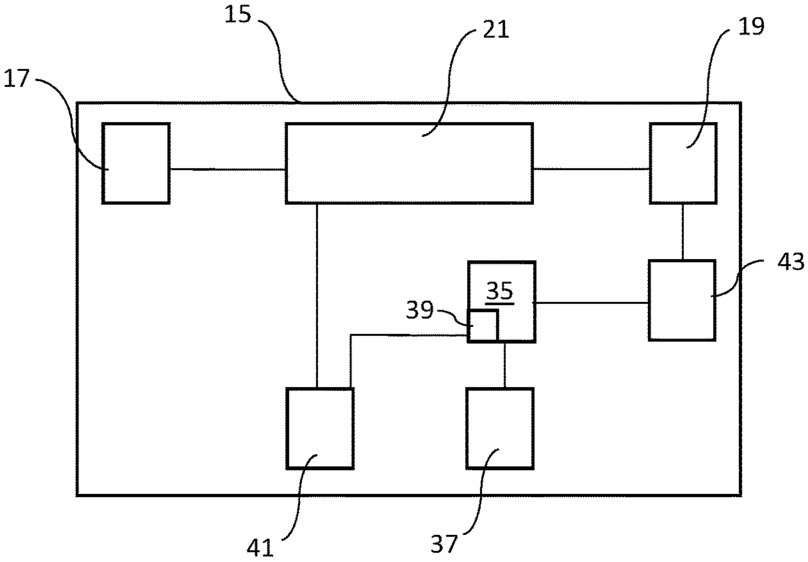
FIG. 2-3 show elements of the device from FIG. 1

FIG. 1 shows an example of an LED based lighting device 1 according to the present disclosure.

The Light Emitting Diode, LED, based lighting device 1 comprises a housing 3. The housing 3 provides an exterior of the LED based lighting device 1 and is arranged for protecting the components provided in the housing 3 from external influences such as weather influences. The housing 3 may be made from a material comprising metal for realizing a relative robust housing to withstand any external mechanical forces acting on the housing 3. Alternatively, the housing 3 may comprise any sort of plastic.

The housing 3 further comprises an opening or window 5 for allowing light generated by light emitting diodes to exit the housing 3 and to provide lighting to the surroundings of the lighting device 1.

The LED based lighting device 1 further comprises a driver module 9, an LED module 11 and an interconnect cable 13. The interconnect cable 13 is connected at a first end thereof to the driver module 9 and at an opposite end thereof to the LED module 9 for electrically interconnecting the driver module 9 and the LED module 11.

The LED module 11 is provided with an LED board 23. The LED board 23 comprises a single metal layer substrate, wherein in said single metal layer substrate a quarter lambda antenna 25 is formed. The quarter lambda antenna 25 forms part of a power supply line 27 arranged for transmitting the LED current to said light emitting diodes 7. The LED current is received by the power supply line 27 via an LED input connector 29 provided on said LED board 23. The LED input connector 29 provides the electrical connection between the interconnect cable 13 and the LED board 23. The light emitting diodes 7 and the antenna 25 are arranged such on the LED board 23 that in an assembled condition of the LED lighting device 1, the antenna 25 and the light emitting diodes 7 are provided behind the opening or window 5 in the housing 3.

Figure 3:
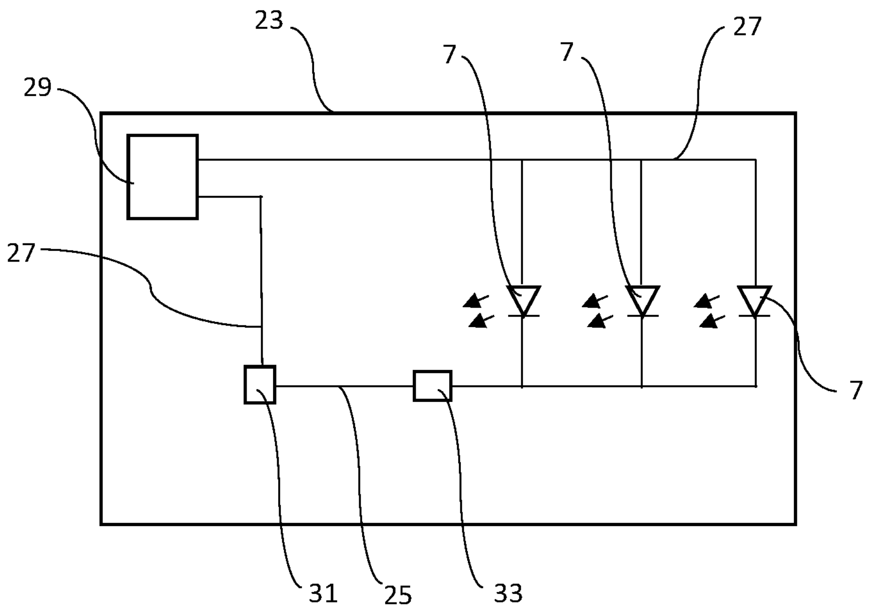

The LED board 23 comprises an antenna inductor 33 and a co-planar waveguide 31, which co-planar waveguide ensures that a 50 ohmic impedance is perceived by the antenna 25, wherein said inductor and said co-planar waveguide are spaced apart a quarter lambda along said power supply line 27. The antenna 25 may be provided in either a plus or minus trace of the power supply line 27. FIG. 3 shows the antenna 25 provided in the minus trace of the power supply line 27.

Following the above, the minus LED-trace is chosen for antenna integration. Since the RF-signal has a high-frequency character and LED current a low-frequency, the injection can be done using a capacitor in case the RF module is present on the LED board (not shown). From the RF injection point to the λ/4 antenna structure, the RF-signal is initially transferred via a 50Ω, co-planar waveguide structure. It may be beneficial to have this structure at least λ/10 long. The width of the microstrip and gap towards the reference planes may be chosen such to ensure a 50Ω characteristic impedance. Note that the co-planar waveguide structure may be guarded on both sides of the microstrip. Hence, the reference structure is closed underneath the high-frequency blocking component, i.e. the inductor, providing a clear path towards the RF-signal injection point.

The length of the λ/4 antenna structure may be defined by placement of the inductor. This inductor provides a low impedance for the LED current but will block the RF-signal to form a λ/4 dipole.

The antenna performance will be depending on the clearance area around the λ/4 antenna structure, the length and width but also the structural integrity of the co-planar waveguide.

The origin of the unbalanced RF-signal can be the RF-driver module which is separated from the LED module. There may be a high-frequency interconnect between the RF-driver and LED module to guarantee a good quality RF transmission and/or reception. This can be a coaxial cable, or an interconnect as described above.

The driver module 9 is arranged for driving the LED module 11 via the interconnect cable 13. To this end the driver module 9 is provided with a driver board 15 comprising a mains input connector 17, an LED output connector 19 and an LED driver 21. The mains input connector 17 may be a standard connector for receiving a mains power supply such as an Alternating Current, AC, mains signal. The LED driver 21 is arranged for receiving the AC mains signal, and for converting the AC mains signal to a low voltage Direct Current, DC, LED current. The DC voltage may be used to power the light emitting diodes 7, via the LED output connector 19 and the interconnect cable 13. The driver board 15 further comprises an RF module 35.

The RF module 35 is arranged for generating an RF signal and for superimposing said generated RF signal on said LED current such that said RF signal is conveyed over said interconnect cable 13 to said antenna 25. The RF module 35 is connected to a Digital Addressable Lighting Interface 37, DALI, provided on the driver board 15, wherein the DALI 37 is arranged for powering the RF module 35. The RF module 35 is provided with an Analog to Digital Converter 39, ADC. The ADC 39 is arranged for providing to a control unit 41 a signal for monitoring, by said control unit 41, an operating power of said light emitting diodes 7. The control unit 41 is communicatively coupled to the LED driver 21 for controlling the operating power of the light emitting diodes 7 taking into account the signal received, by the control unit 41, from the ADC 39. The RF signal is superimposed on said interconnect cable 13 via capacitors 43 that are provided between the RF module 35 and the LED output connector 19.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article, "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an Any reference signs in the claims should not be construed as limiting the scope thereof.

The invention claimed is:

1. A Light Emitting Diode (LED) based lighting device capable of Radio Frequency (RF) communication, said LED based lighting device comprising:

a driver board comprising a mains input connector, an LED output connector and an LED driver, wherein said LED driver is arranged for receiving a mains power supply, via said mains input connector, and for providing an LED current to an at least one LED, via said LED output connector;

an LED board comprising an LED input connector, an antenna and said at least one LED; and an interconnect cable connecting said driver board to said LED board via said LED output connector and said LED input connector, for conveying said LED current from said driver board to said LED board;

wherein said driver board further comprises:

an RF module arranged for generating an RF signal and for superimposing said generated RF signal on said LED current such that said RF signal is conveyed over said interconnect cable to said antenna via capacitors that are provided between the RF module and the LED output connector, wherein said LED board comprises:

an RF extraction module arranged for extracting said superimposed RF signal from said LED current and for providing said extracted RF signal to said antenna.

2. The LED based lighting device in accordance with claim 1, wherein said interconnect cable comprises two conductors, a first of said two conductors is arranged for conveying said LED current from said driver board to said LED board, and a second of said two conductors is arranged for providing a return path for said LED current from said LED board to said driver board, thereby providing differential LED wires, wherein said RF module is further arranged for superimposing said generated RF signal on said differential LED wires thereby providing a balanced RF signal.

3. The LED based lighting device in accordance with claim 1, wherein said driver board further comprises:

an Electromagnetic Interference (EMI) filter, for reducing EMI, wherein said EMI filter is connected to said LED output connector, and wherein said RF module is arranged for superimposing said generated RF signal on said LED current in between said EMI filter and said LED output connector.

4. The LED based lighting device in accordance with claim 1, wherein said LED board is formed by a Printed Circuit Board (PCB) and comprises:

LED supply traces, on said PCB, for connecting said LED input connector to said at least one LED, wherein said antenna is formed in any of said LED supply traces.

5. The LED based lighting device in accordance with claim 4, wherein said antenna is formed by including at least one inductor in said LED supply traces.

6. The LED based lighting device in accordance with claim 5, wherein said antenna is formed, at one end, by said at least one inductor in said LED supply traces and, at another end, by a predefined characteristic impedance.

7. The LED based lighting device in accordance claim 1, wherein said driver board comprises an insulation barrier for electrically isolating a first part, which is connected to said mains power supply with a second part, which is connected to said LED output connector, wherein said RF module is situated at said second part.

8. The LED based lighting device in accordance with claim 7, wherein said driver board further comprises:

a Digital Addressable Lighting Interface (DALI) module which is situated at said second part, a voltage converter, situated at said first part, for converting said mains power supply to a DALI Direct Current (DC) voltage, wherein said voltage converter comprises a transformer placed over said insulation barrier, wherein an output of said transformer is connected to said DALI module, and an RF module voltage converter, situated at said second part, for converting said DALI DC voltage to an RF supply voltage for powering said RF module.

9. The LED based lighting device in accordance with claim 7, wherein said RF module is further arranged for power metering an output of said LED driver.

10. The LED based lighting device in accordance with claim 9, wherein said driver board further comprises an optocoupler connected to said RF module for coupling a measured power over said insulation barrier.

11. The LED based lighting device in accordance with claim 1, wherein said driver board is provided in a metal casing.

12. The Light Emitting Diode, LED, board for operation in an LED based lighting device in accordance with claim 1, wherein said LED board comprises:

an LED input connector for providing an electrical connection between the interconnect cable and the LED board;

an antenna;

an antenna inductor;

a co-planar waveguide; and said at least one LED;

wherein said LED board comprises a power supply line for supplying, via said LED input connector, said LED current to said at least one LED, and wherein said power supply line forms said antenna, wherein the antenna inductor and the co-planar waveguide are spaced apart a quarter lambda along said power supply line.

* * * * *